Patented Mar. 21, 1939

2,151,651

UNITED STATES PATENT OFFICE 2,151,651

STABILIZED ROTENONE COMPOSITIONS

Ludwig J. Christmann, Jersey City, and David W. Jayne, Jr., Elizabeth, N. J., assignors to American Cyanamid Company, New York, N. Y., a corporation of Maine No Drawing. Application November 18, 1932, Serial No. 643,290

4 Claims. (Cl. 167—24)

This invention relates to insecticidal compositions and it has particular relation to naturally occurring insecticides obtained from certain species of plants.

The invention has for its main objects the provision of an insecticidal composition of the above indicated character which is simple and inexpensive to prepare, which is highly toxic to insect life, and which retains its desirable insecticidal properties over a relatively long period of time.

It has heretofore been observed that a certain relatively complex organic substance known to the industry as "Rotenone" is highly effective poison particularly for the lower forms of animal life. However, their toxic effects are relatively slight upon the warm-blooded animals. Rotenone is the active principle of two species of plants known, respectively, as Derris elliptica and Derris chinensis. This active principle may also be isolated from other plants such as Lonchocarpus, Milletia taiwaniana, Hayata, Mindulea suberosa and Ormocarpum. It is likewise obtained from a material employed by the Peruvians as a fish poison and termed by them "cube." Rotenone is familiar to the industry and its extraction from the plants or particularly the plant roots, in which, in most cases, it is most abundant, does not constitute a portion of the present invention.

We have observed that Rotenone, while possessed of excellent insecticidal properties, upon exposure to light and air or oxygen gradually lost its desirable properties and in the course of a short time it became ineffective and useless. This invention involves the discovery that this gradual deterioration of Rotenone can be materially retarded by incorporating thereinto certain stabilizing substances which prolong the life of Rotenone but which do not materially interfere with the action thereof as an insecticidal composition. Stabilizing ingredients which may be used in Rotenone without destroying or materially lessening the insecticidal properties thereof embraces a relatively wide class of materials. The materials embraced within the classes of organic acids, amines and phenols may be employed successfully as stabilizers in Rotenone. The stabilizing properties of certain of these amino bodies and phenols are not in all cases sufficiently lasting to admit of their commercial competition with other members of the same class. This, in most cases, appears to be due to the fact that the stabilizing materials (amines or phenols) are relatively volatile in character and when they are exposed over relatively extensive surfaces, such as occur when the Rotenone is applied to fabrics for moth-proofing purposes or when the material is sprayed upon vegetation or other common materials on which insecticides are applied, there is a gradual loss of the stabilizer through vaporization. Also in the case of relatively unstable amines or phenols there is a tendency for them to decompose or split-up upon aging under the action of air and light. Therefore, the present invention contemplates principally those stabilizers which are not subject to these defects, although they also are included.

Reduction of the volatility of amino and phenolic bodies so as to obtain permanence in Rotenone or similar insecticides is best obtained by incorporating into the hydrocarbon portion of phenolic or amino molecule certain substituents such as chlorine, hydroxy, carboxy, or similar groups. For example, chlorine groups may be introduced into the aniline molecule and in the case of dichlor aniline a highly satisfactory stabilizer for the insecticide, Rotenone, is obtained and the substituents (chlorine) so reduce the volatility of the stabilizer that it retains its desirable properties over a relatively long period of time. In fact in some cases the life of the insecticide after application may be still further multiplied thereby. It is also possible that one or more of the chlorine groups in the chlor substituted anilines may be replaced by hydroxy groups to obtain a stabilizer having the characteristics both of a phenol and an amine. Also chlor anilines containing methyl or ethyl groups or similar hydrocarbon groups may likewise be employed.

In the case of phenolic bodies satisfactory decrease of the volatility of the compound to obtain a material sufficiently permanent for use in Rotenone may be effected by the introduction of carboxylic groups into the benzene nucleus. As a specific example of such material, attention is called to salicylic acid which contains a hydroxy and a carboxylic group attached to the same benzene nucleus. Of course, additional groups such as amino or methyl groups may be introduced into the benzene nucleus. However, in most cases the introduction of such groups involves additional expense and probably for commercial application would be less desirable than the simpler but more readily obtained primary materials, salicylic acid.

Another class of compounds which is highly satisfactory as a stabilizer in Rotenone is the anthranilic acid group, which embodies a benzene nucleus containing an amino group and an additional carboxyl group, which serves to reduce the volatility of the simple amine. Of course, chlorine atoms may be introduced into the benzene nucleus of this compound. Specific examples of such chlorine substituted anthranilic acids are the mono-chlor an di-chlor compounds. It will also be understood the hydroxy substituted anthranilic acids are also embraced within the spirit of the invention.

Nitro substituted phenolic amino compounds, such as those above described, may likewise be employed for some purposes. However, nitro groups tend to increase the toxicity of the materials and for that reason for many purposes such as the spraying or dipping of fabrics to prevent the action of moths, their use may be less desirable than the compounds which are free of nitro groups.

Further reductions of the volatility of the stabilizers, particularly the amino compounds, may be effected by incorporating them with fatty acids, such as oleic acid and so forth. A particularly satisfactory result is obtained by the admixture or reaction of 2-5 dichlor aniline with oleic acid. The dichlor aniline reacts with the oleic acid forming the oleate and there is no appreciable retardation of the stabilizing action of the amine. At the same time volatility is materially reduced so that the stabilizer remains in the Rotenone over an appreciably longer period of time.

The stabilizer material may be incorporated in the Rotenone in substantially any desired or convenient manner. For example, the Rotenone may be dissolved in a solvent, such as acetone, which is also a solvent for most of the stabilizers and then the stabilizer may be incorporated therein. Quite satisfactory results are obtained by the use of an acetone solution containing $\frac{3}{10}$% of Rotenone and $\frac{1}{10}$ to $\frac{3}{10}$ grams of any of the above indicated stabilizers per 100 cubic centimeters of solution. Other solvents such as benzene or toluene or mixtures of other solvents or mixtures of these solvents with acetone may likewise be employed.

It will also be understood that any two or more of the above described stabilizers may also be mixed and the mixture employed in Rotenone. These mixtures may under some circumstances be more desirable than any of the simple compounds. It will also be understood that stabilizers, such as previously described, may be incorporated into Rotenone powders which are used for dusting purposes.

The process as thus described for enhancing the durability of Rotenone after application is extremely simple in character and does not require the use of any expensive or unusual apparatus and does not require any high degree of technical skill in its use. The stabilizers described or the equivalents which may readily be selected, by those skilled in the art, from the less volatile and more durable of the organic acids, phenols and amines are relatively inexpensive and their admixture with the Rotenone is extremely simple. The compounds employed as stabilizers do not decompose the Rotenone or appreciably reduce its activity as an insecticide, but instead, in some cases, the stabilizers themselves may exhibit considerable insecticidal power and thus increase rather than decrease the insecticidal action.

Although we have shown and described only the preferred forms of stabilizers, it is to be understood that the invention is not limited to these particular embodiments, but that numerous modifications and adaptations may be made therein without departure from the spirit of the invention or the scope of appended claims. For instance, polyhydroxy phenols, polyamino compounds and mixed hydroxy-amino, hydroxy-carboxy, amino-carboxy compounds may be used.

What we claim is:

1. Rotenone containing a stabilizer selected from a class consisting of aminophenols, dichloraniline, salicylic acid, and anthranilic acids.
2. Rotenone containing salicylic acid.
3. Rotenone containing dichloraniline.
4. An insecticide comprising Rotenone and an aminophenol to stabilize the same.

LUDWIG J. CHRISTMANN.
DAVID W. JAYNE, Jr.